United States Patent [19]

Suzuka

[11] Patent Number: 5,353,082
[45] Date of Patent: Oct. 4, 1994

[54] CAMERA SYSTEM HAVING A DETACHABLE REMOTE CONTROLLER WITH DIFFERENT FUNCTIONS

[75] Inventor: Shinya Suzuka, Saitama, Japan

[73] Assignee: Asahi Kogaku Kogyo Kabushiki Kaisha, Tokyo, Japan

[21] Appl. No.: 854,003

[22] Filed: Mar. 19, 1992

[30] Foreign Application Priority Data

Mar. 22, 1991 [JP] Japan .................. 3-041503[U]

[51] Int. Cl.⁵ ............................. G03B 17/38
[52] U.S. Cl. ............................... 354/266
[58] Field of Search ............. 354/266, 173.1, 195.1

[56] References Cited

U.S. PATENT DOCUMENTS

| | | | |
|---|---|---|---|
| 3,848,984 | 11/1974 | Kanno | 354/441 |
| 4,864,340 | 9/1989 | Kaneko | 354/266 |
| 4,937,604 | 6/1990 | Yoshida et al. | 354/266 |
| 5,014,080 | 5/1991 | Miyadera | 354/266 X |
| 5,093,679 | 3/1992 | Taniguchi et al. | 354/266 X |
| 5,122,880 | 6/1992 | Nagano | 358/209 |

*Primary Examiner*—Michael L. Gellner
*Assistant Examiner*—J. K. Han
*Attorney, Agent, or Firm*—Sandler Greenblum & Bernstein

[57] ABSTRACT

In a camera system having a camera body and a remote controller detachably coupled to the camera body, at least one operation button is provided on the remote controller. A predetermined operation signal is transmitted from the remote controller to the camera body when the operation button is operated. Upon operation of the at least one operation button, selected one of predetermined operations is executed when the remote controller is coupled to the camera body. Another one of the predetermined operations is executed when the remote controller is detached from the camera body.

12 Claims, 4 Drawing Sheets

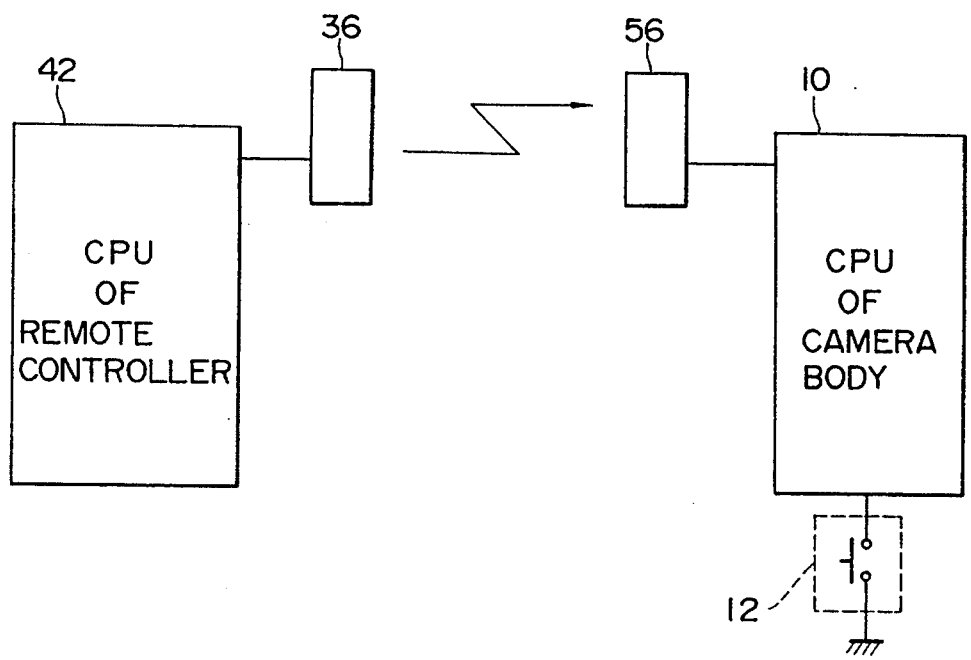

CAMERA SYSTEM HAVING A DETACHABLE REMOTE CONTROLLER WITH DIFFERENT FUNCTIONS

BACKGROUND OF THE INVENTION

The present invention relates to a camera system having a camera body and a remote controller which is detachably coupled to the camera body.

Recently, camera systems having camera bodies and remote controlling devices, or remote controllers for controlling the operation of the camera systems have been developed. In such camera systems, shooting operation can be easily performed remote from the camera body with use of the remote controllers, which contribute to enlarge the usage of the cameras.

Further, the remote controllers are required to be detachably attached to the camera body. If the remote controller is attached to the camera when normally used, an operator is not necessary to carry the remote controller independent of the camera body.

On the other hand, in recent years, camera system have been developed that have a plurality of functions. Accordingly, the number of operation switches provided on the camera body has increased. This plurality of operation switches restrict the positions in the camera body where the remote controller may be attached, and further prevents the camera system from being made compact in size.

SUMMARY OF THE INVENTION

It is therefore an object of the present invention to provide an improved camera system having a camera body, and a remote controller which is detachably coupled to the camera body, even though a plurality of operation switches are provided.

For the above object, according to the present invention, there is provided a camera system having a camera body, and a remote controller detachably coupled to the camera body, with at least one operation means being provided on the remote controller for transmitting an operation signal to the camera body, said system includes means for discriminating whether the remote controller is coupled to said camera or not.

The camera system further includes means for initiating a selected one of predetermined operations, upon operation of at least one operation means, when it is discriminated by the discriminating means that the remote controller is coupled to said camera body, and for initiating another one of the predetermined operations, upon operation of at least one operation means, when it is discriminated by the discriminating means that the remote controller is detached from the camera body.

Optionally, means for discriminating is provided in the camera body.

According to another aspect of the invention, there is provided a camera body to which a remote controller is detachably coupled. At least one predetermined signal is transmitted from the remote controller to the camera body, the camera body includes means for discriminating whether the remote controller is coupled to said camera or not.

The camera body further includes means for initiating a selected one of predetermined operations, upon receipt of at least one predetermined operation signal, when it is discriminated by the discriminating means that the remote controller is coupled to the camera body, and for initiating another one of the predetermined operations, upon receipt of at least one operation signal, when it is discriminated by the discriminating means that the remote controller is detached from the camera body.

According to a further aspect of the invention, there is provided a camera body to which a remote controller is detachably coupled. At least operation means is provided on said remote controller for transmitting an operation signal to the camera body, the camera body includes means for initiating a selected one of predetermined operations upon operation of the at least one operation means when the remote controller is coupled to the camera body, and for initiating another one of the predetermined operations upon operation of at least one operation means when the remote controller is detached from the camera body.

According to still another aspect of the invention, there is provided a camera system having a camera body, and a remote controller detachably coupled to the camera body. At least one operation member is provided on the remote controller. A predetermined operation signal is transmitted to the camera body upon operation of the operation member. The camera system includes:

means for discriminating whether the remote controller is coupled to the camera or not.

The camera system further includes means for initiating one of predetermined operations to be performed by the camera body upon receipt of the predetermined operation signal when it is discriminated by the discriminating means so that the remote controller is coupled to the camera body, and for initiating another one of the predetermined operations, upon receipt of the predetermined operation signal when it is discriminated by the discriminating means that the remote controller is detached from the camera body.

DESCRIPTION OF THE ACCOMPANYING DRAWINGS

FIG. 7 is a block diagram illustrating communication between the camera and the remote controller as a third embodiment of the camera system.

DESCRIPTION OF THE EMBODIMENTS

Figure 1:
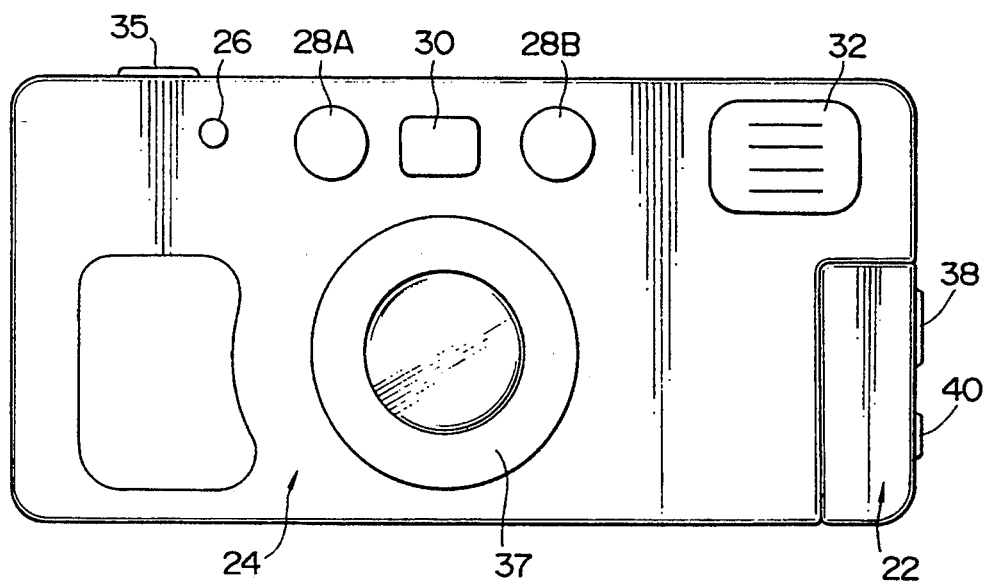
FIG. 1 is a front view of a camera system embodying the present invention.

FIG. 1 is a front view of a camera system embodying the present invention. On a camera body 24, these are provided a pair of windows 28A, and 28B for range finding, a finder 30, a strobe 32, a zoom lens 37, and a shutter button 35. A remote controller 22 is detachably coupled to the camera body 24 using a well-know method. Note that in normal usage, shooting of a photograph is executed with the remote controller 22 being coupled to the camera body 24.

Figure 2:
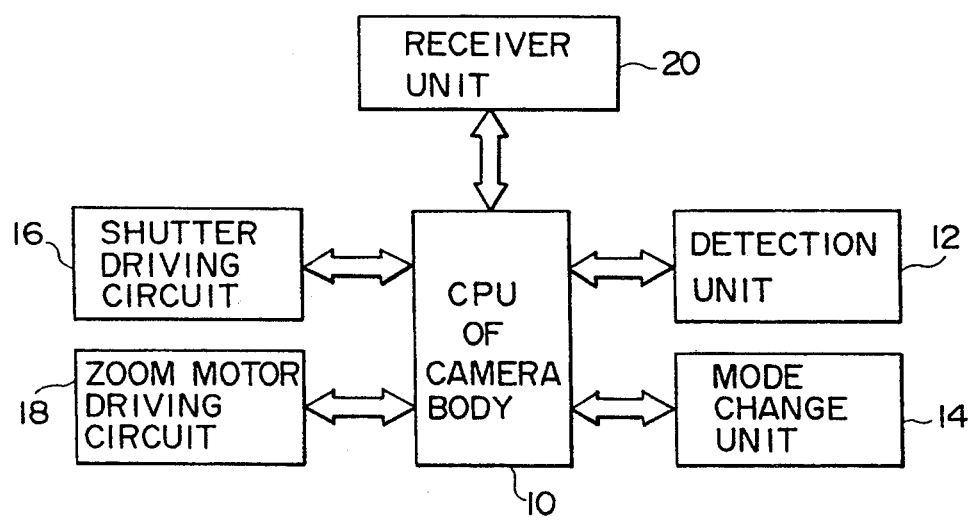
FIG. 2 is a block diagram illustrating circuits in the camera system of FIG. 1.

FIG. 2 is a block diagram illustrating main circuits in the camera system of FIG. 1. A CPU (Central Processing Unit) 10, is in communication with a detection unit 12 for detecting when the remote controller 22 is detached from the camera body 24, a mode change unit 14 for changing an operation mode of the camera system, a shutter driving circuit 16, a zoom motor driving circuit 18, arid a receiver unit 20 for receiving a signal transmitted from the remote controller.

The detection unit 12 transmits a detection signal to the CPU 10 whether the remote controller 22 is attached to the camera body 24 or detached.

The mode change unit 14 transmits a mode signal to the CPU 10 in accordance with one of the operation modes, switched by an operator of the camera system. Upon receipt of the mode signal from the mode change unit 14, for example, the CPU 10 shifts a film feeding mode between a continuous shooting mode and a single frame shooting mode, and shifts an exposure mode between a forcible strobe lighting mode and a normal exposure mode. The strobe 32, a film feeding motor, a shutter driving circuit, etc. are driven by the CPU 10 in the set mode.

Further, the CPU 10 determines an aperture value, and a shutter speed base on a photometry value transmitted from a photometry circuit in accordance with the set exposure mode. Since such determination of the aperture value and the shutter speed is well-know, the description thereof is omitted in the present specification. Further, also in accordance with a well-know method, the zoom motor driving circuit 18 transmits a drive signal to a zoom motor in response to the operation off a zoom switch so as to drive the zoom lens 37 toward a tele or wide side by a desired amount.

The receiver unit 20 receives a control signal transmitted from the remote controller 22. More specifically, the receiver unit 20 is electrically connected with a receiver window 26 provided in the camera body 24. The receiver window 26 receives an infrared light emitted from the remote controller, and processes the same in a predetermined manner to generate the control signal, and then transmits it to the CPU 10. The CPU 10 transmits drive signals to the shutter driving circuit 16, the mode change unit 14, etc. so that respective circuits are driven as the operator instructed.

Figure 3:
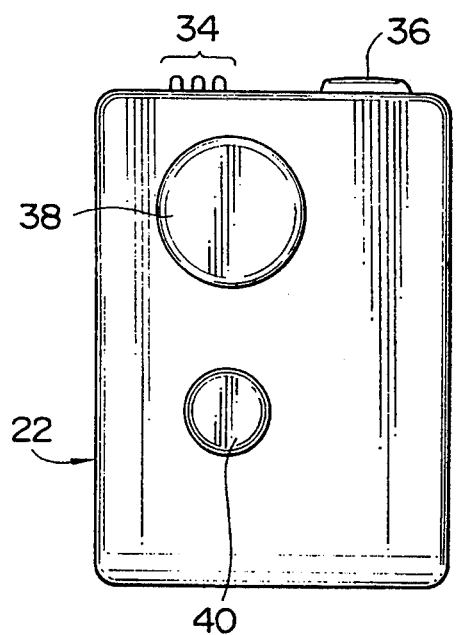
FIG. 3 is a front view of a remote controller of the camera system.
Figure 4:
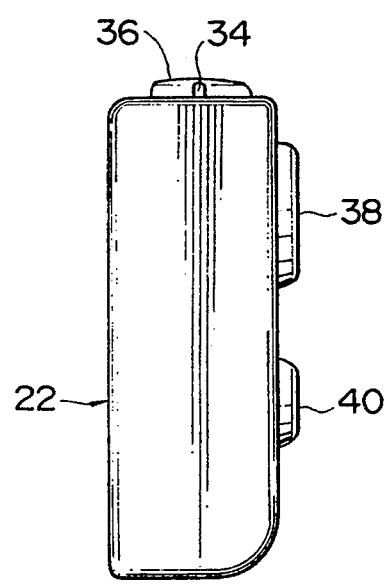
FIG. 4 is a side view of the remote controller of FIG. 3.
Figure 5:
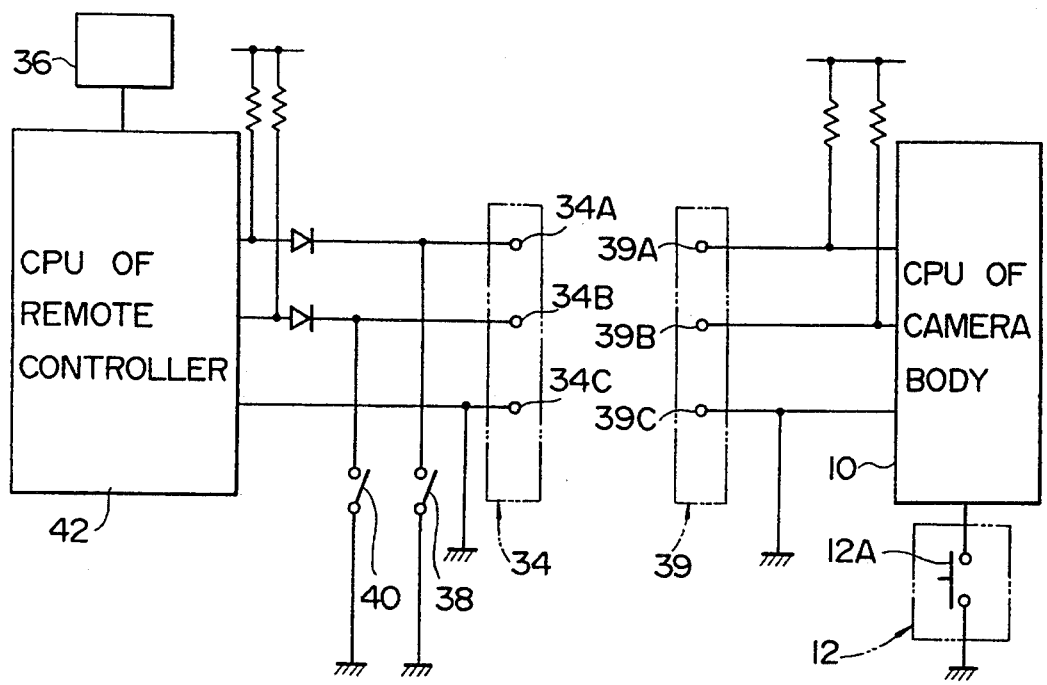
FIG. 5 is a block diagram illustrating communication between the camera and the remote controller of a first embodiment of the camera system.

FIG. 3 is a front view of a remote controller of the camera system. FIG. 4 is a side view of the remote controller of FIG. 3, FIG. 5 is a block diagram illustrating communication between the camera and the remote controller of a first embodiment of the camera system.

As shown in FIGS. 3 and 4, connect pins 34 are positioned in the remote controller 22 as means for transmitting the control signal to the CPU 10. The pins 34 are in contact with contacts 39 provided on the camera body 24 for receiving the control signal when the remote controller 22 is attached to the camera body 24.

On the upper surface of the remote controller 22, a light emitter 36, for emitting an infrared light is provided. When switches 38 or 40 on the remote controller 22 are operated, the light emitter 36 emits infrared light carrying pulse code information corresponding to the operated one of switches 38 and 40. The infrared light emitted by the light emitter 36 is received by the receiver window 26, then the receiver unit 20 transmits the control signal to the CPU 10.

The switches 38 and 40 on the remote controller 22 function as a release switch and zoom switch when the remote controller 22 is detached from the camera body 24, respectively. The switches 38 and 40 function as a mode change switch and drive change switch, respectively, when the remote controller 22 is attached to the camera body 24.

The above, functional change of the switches 38 and 40 is controlled in response to the detection signal detected by the detection unit 12.

In the remote controller 22, a CPU 42 for controlling transmission of a control signal is provided as shown in FIG. 5. When the remote controller is attached to the camera body 24, a switch 12A is turned ON, and the pin 34 and the contact 39 come into contact, thereby the circuit connecting the CPU 10 of the camera body 24 and the CPU 42 of the remote controller 22 is closed. The switch 12A is a mechanical switch for causing the CPU 10 to recognize that the remote controller 22 is attached to the camera body 24. In this regard, the switch 12A is preferably a push switch or the like, which is turned ON by a pressing force generated when the remote controller 22 is installed to the camera body 24.

The pins 34 have three pins 34A, 34B and 34C, and the contacts have three contacts 39A, 39B, and 39C. When the remote controller 22 is attached to the camera body 24, the pins 34A, 34B and 34C contact the contacts 39A, 39B and 39C, respectively, and the communication between the CPU 10 and CPU 42 becomes available through the pins 34 and contacts 39. The pins 34A and 34B are connected to a regular voltage source, not shown, via pull-up resistors. Accordingly, the voltage level of the each of pins 34A and 34B is set to a predetermined High level. Similarly, the contacts 39A and 39B are connected to another regular voltage source of the camera body 24 through pull-up resisters, and set to a predetermined High voltage level. The pin 34C and contact 39C are to be connected with each other, and are respectively grounded, so that the grounded voltage value of the remote controller 22 and the camera body 24 coincide with each other.

A signal responsive to the operation of the switch 38 is transmitted through the pin 34A and the contact 39A to the CPU 10. When the switch 38 is turned ON, the voltage level of the contact 39 changes from High level to Low level. With this change of the voltage level of the contact 39, the CPU 10 recognizes that the switch 38 has been operated, and transmits a control signal instructing a mode change to the mode change unit 14.

A signal responsive to the operation of the switch 40 is transmitted through the pin 34B and the contact 39B to the CPU 10. When the switch 39 is turned ON, the CPU 10 transmits a control signal instructing a change of a film feeding mode to the mode change unit 14. Pin 34C and contact 39C are grounded.

When the remote controller 22 is detached from the camera body 24, the switch 12A is turned OFF, thereby the CPU 10 recognizes the condition that the remote controller 22 is detached. When the CPU 10 recognizes the remote controller 22 is detached, the CPU 10 transmit a mode change signal to the receiver unit 20. Upon receiving the mode change signal from the CPU 10, the receiver unit 20 assumes a stand-by condition, wherein the infrared light can be received through the receiver window 26.

In the above condition, the switch 38 functions as a release switch, when shooting is remotely controlled.

When the operator operates the switch 38, the CPU 42 recognizes that the switch 38 is operated because the voltage level of the pin 34A is changed from High to Low level, and causes the infrared light to be emitted through a light emitting port 36 toward the receiver window 26. Upon receiving the light, the receiver unit 20 transmits a recognition signal carrying information, that the switch 38 is operated, to the CPU 10. Since the switch 12A is turned OFF and it is recognized that the remote controller 22 is not attached to the camera body 24, the CPU recognizes the input of the recognition signal as a release initiate signal, and transmits a drive signal to the shutter driving circuit 16 so that the shooting is executed. Further, with the condition that the remote controller 22 is detached from the camera body 24, the switch 40 functions as a zoom switch. Thus the operator can move the lens of the camera by operating the switch 40.

As above, in the above-described camera system, the switches 38 and 40 provided on the remote controller respectively function as:

(a) a release switch, and a zoom switch when the remote controller 22 is detached from the camera body 24; and (b) a mode change switch, and a drive change switch when the remote controller 22 is attached to the camera body 24.

In the remote controller, the release switch and the zoom switch are indispensable. According to the present invention, it is not necessary to provide an extra release switch and zoom switch for the remote controller 22. Further, the switches required for the operation of the camera system can be provided on the remote controller. Accordingly, the number of switches of the camera system can be reduced.

Figure 6:
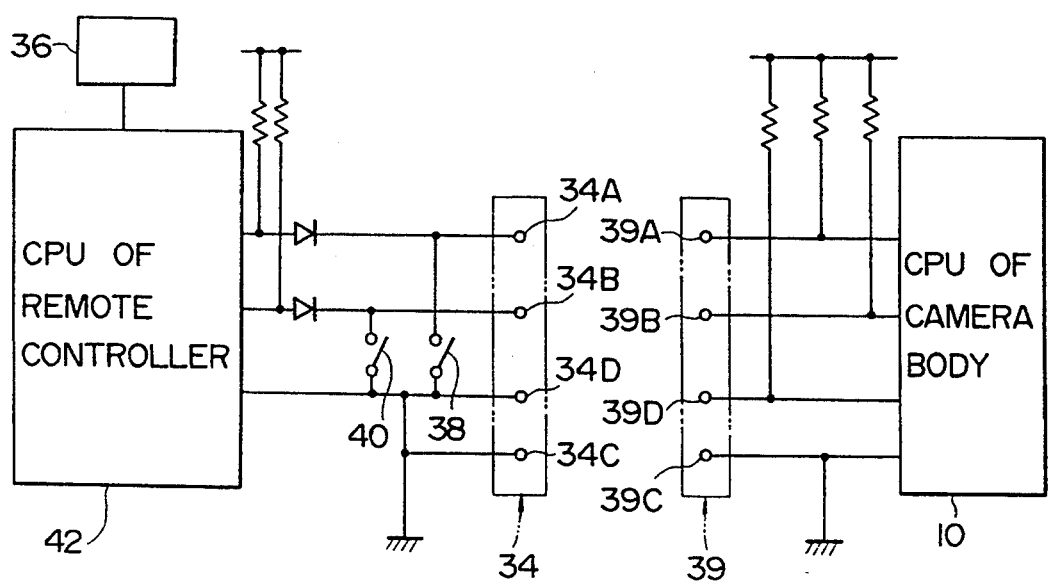
FIG. 6 is a block diagram illustrating communication between the camera and the remote controller as a second embodiment of the camera system.

FIG. 6 shows a second embodiment. In the above-described embodiment, the attached/detached condition of the remote controller 22 is mechanically detected by the detection unit 12. In this second embodiment, the attached/detached condition of the remote controller 24 is detected electrically. In the second embodiment of FIG. 6, a detection pin 34D, and a detection contact 39D to be connected to the detection pin 34D, are provided on the remote controller 22 and the camera body 24, respectively. The detection pin 34D is electrically connected to the regular voltage source of the camera body via pull-up resisters. With this construction, when the remote controller 22 is removed from the camera body 24, the voltage of the contact 39D becomes High level. When the remote controller 22 is attached to the camera body 24, since the contact 39D is grounded through the pin 34D, the voltage of the contact 39D becomes Low level. The CPU 10 of the camera body 24 discriminates whether the remote controller 22 is attached to the camera body in accordance with the voltage level of the contact 39D.

FIG. 7 shows a third embodiment of the present invention. In the third embodiment, a second receiver unit 56, for receiving infrared light, is provided on the camera body 24 in such a fashion that the second receiver unit 56 is capable of receiving the light emitted from the light emitting portion 36 of the remote controller 22, when the remote controller 22 is attached to the camera body 24. Further, the detection unit 12, similar to that of the first embodiment, as shown in FIG. 5, is provided. When the control signal is transmitted from the remote controller to the receiver window 26 or the second receiver unit 56, the CPU 10 outputs the signal corresponding thereto in accordance with the detection signal from the detection unit 12.

In the above described embodiments, the switches 38 and 40 are provided, with the switch 38 functioning as a release switch or a mode change switch. The switch 40 functions as a zoom switch or a drive change switch. It should be noted, however, that the invention is not limited to the specific features described above, and can be embodied in any other forms without departing from the spirit or essential characteristics thereof. For example, the number of switches on the remote controller, or the functions thereof can be arbitrarily set.

Further, in the embodiments described above, the attaching/detaching of the remote controller to the camera body is detected with use of the detection unit or detection pin and contact. A modification as follows is also possible. That is, the CPU 10 detects at which portion the signal from the remote controller 22 is inputted, and changes the function of the switches on the remote controller 22. With this construction, means for detecting the attached/detached condition of the remote controller can be omitted, thereby construction of the camera system is simplified.

As described above, according to the present invention, it is detected whether the remote controller is attached or detached, and the operation mode of the camera system is changed based on the detection result, even if the same switch on the remote controller is operated. Accordingly, the number of the switches required for the camera system can be reduced. Flexibility in designing the arrangement of the switches on the camera system is increased. Further, the camera system can be made compact.

What is claimed is:

1. A camera system comprising a camera body and a remote controller detachably coupled to said camera body, at least one operation means being provided on said remote controller for transmitting an operation signal to said camera body, said system further comprising:

means for discriminating whether said remote controller is coupled to said camera;

said at least one operation means being accessible to a user when said remote controller is both coupled to said camera body and detached from said camera body; and means for initiating a selected one of predetermined operations, upon operation of said at least one operation means, when said discriminating means determines that said remote controller is coupled to said camera body, and for initiating a different one of said predetermined operations, upon operation of said at least one operation means, when said discriminating means determines that said remote controller is detached from said camera body.

2. The camera system according to claim 1, wherein said means for discriminating is provided in said camera body.

3. The camera system according to claim 2, wherein said means for discriminating comprises first and second signal receiving means, and wherein said discriminating means determines that said remote controller is coupled to said camera body when said operation signal is received by said first signal receiving means, while said discriminating means determines that said remote controller is detached from said camera body when said operation signal is received by said second signal receiving means.

4. The camera system according to claim 3, wherein said remote controller comprises means for emitting infrared light, and at least one terminal, and wherein said first signal receiving means comprises at least one another terminal to be electrically connected to said at least one terminal, and said second signal receiving means comprises an infrared light receiving means for receiving the infrared light emitted from said means for emitting.

5. The camera system according to claim 3, wherein said remote controller comprises means for emitting infrared light, and wherein said first and second signal receiving means comprise infrared light receiving means, respectively.

6. The camera system according to claim 1, wherein said operation means comprises an operation member, a predetermined signal being transmitted from said remote controller to said camera body, said means for initiating initiates the release operation upon operation of said operation member only when said remote controller is detached from said camera body.

7. The camera system according to claim 6, which is capable of executing photographic shooting in a plurality of exposure modes and wherein said means for initiating changes the exposure mode upon receipt of said predetermined signal only when said remote controller is coupled to said camera body.

8. The camera system according to claim 1, which further comprises a zoom lens capable of moving, and wherein said operation means comprises an operation member, a predetermined signal being transmitted from said remote controller to said camera body, said means for initiating initiates the zooming operation upon receipt of said predetermined signal only when said remote controller is detached from said camera body.

9. The camera system according to claim 8, which is capable of feeding a film in a continuous feeding mode, or in a single frame feeding mode, and wherein said means for initiating changes the film feeding mode upon receipt of said predetermined signal only when said remote controller is coupled to said camera body.

10. A camera body to which a remote controller is detachably coupled, at least one predetermined signal being transmitted from said remote controller to said camera body, said remote controller including at least one operation means for initiating said at least one predetermined signal, said at least one operation means being accessible to a user when said remote controller is both coupled to said camera body and detached from said camera body, said camera body comprising:

means for discriminating whether said remote controller is coupled to said camera body;

means for initiating a selected one of predetermined operations, upon receipt of said at least one predetermined operation signal, when said discriminating means determines that said remote controller is coupled to said camera body, and for initiating a different one of said predetermined operations, upon receipt of said at least one operation signal, when said discriminating means determines that said remote controller is detached from said camera body.

11. A camera body to which a remote controller is detachably coupled, at least one operation means being provided on said remote controller for transmitting an operation signal to said camera body, said at least one operation means being accessible to a user when said remote controller is both coupled to said camera body and detached from said camera body, said camera body comprising:

means for initiating a selected one of predetermined operations upon operation of said at least one operation means when said remote controller is coupled to said camera body, and for initiating a different one of said predetermined operations upon operation of said at least one operation means when said remote controller is detached from said camera body.

12. A camera system comprising a camera body and a remote controller detachably coupled to said camera body, at least one operation member being provided on said remote controller, a predetermined operation signal being transmitted to said camera body upon operation of said operation member, said camera system further comprising:

means for discriminating whether said remote controller is coupled to said camera;

said at least one operation member being accessible to a user when said remote controller is both coupled to said camera body and detached from said camera body; and means for initiating a selected one of predetermined operations to be performed by said camera body upon receipt of said predetermined operation signal when said discriminating means determines that said remote controller is coupled to said camera body, and for initiating a different one of said predetermined operations, upon receipt of said predetermined operation signal when said discriminating means determines that said remote controller is detached from said camera body.

* * * * *